United States Patent
Druant et al.

(10) Patent No.: US 11,967,888 B2
(45) Date of Patent: Apr. 23, 2024

(54) ELECTRIC MOTOR AND INVERTER ASSEMBLY WITH BUS BAR AND COOLING CHANNEL

(71) Applicant: Dana Belgium N.V., Bruges (BE)

(72) Inventors: Joachim Druant, Merkem (BE); Steven Vanhee, Hooglede (BE)

(73) Assignee: DANA BELGIUM N.V., Bruges (BE)

( * ) Notice: Subject to any disclaimer, the term of this patent is extended or adjusted under 35 U.S.C. 154(b) by 148 days.

(21) Appl. No.: 17/643,570

(22) Filed: Dec. 9, 2021

(65) Prior Publication Data

US 2022/0190684 A1 Jun. 16, 2022

(30) Foreign Application Priority Data

Dec. 11, 2020 (DE) ...................... 10 2020 133 190.8

(51) Int. Cl.
*H02K 9/19* (2006.01)
*H02K 5/18* (2006.01)
*H02K 5/20* (2006.01)
*H02M 7/00* (2006.01)

(52) U.S. Cl.
CPC ................ *H02K 9/19* (2013.01); *H02K 5/18* (2013.01); *H02K 5/203* (2021.01); *H02M 7/003* (2013.01)

(58) Field of Classification Search
CPC .......... H02K 9/19; H02K 9/193; H02K 9/197; H02K 5/18; H02K 5/20; H02K 5/203; H02M 7/003
See application file for complete search history.

(56) References Cited

U.S. PATENT DOCUMENTS

2015/0216083 A1* 7/2015 Kanazawa ............. H02K 11/33
 361/717
2018/0316239 A1* 11/2018 Ogawa ................... H02K 3/522

FOREIGN PATENT DOCUMENTS

JP 2013233052 A * 11/2013 ............. H02K 11/33
JP 5870797 B2 3/2016

OTHER PUBLICATIONS

Kawashima (JP 2013233052 A) English Translation (Year: 2013).*

* cited by examiner

*Primary Examiner* — Tulsidas C Patel
*Assistant Examiner* — Robert E Mates
(74) *Attorney, Agent, or Firm* — McCoy Russell LLP

(57) ABSTRACT

An electric motor and inverter assembly and a method of assembly therefor, the electric motor and inverter assembly having a motor housing portion, a DC bus bar for electrically connecting a DC power source to an inverter power module where the DC bus bar is mounted on the housing portion, and a cooling channel disposed in between the housing portion and the DC bus bar for cooling the DC bus bar.

17 Claims, 6 Drawing Sheets

ELECTRIC MOTOR AND INVERTER ASSEMBLY WITH BUS BAR AND COOLING CHANNEL

CROSS REFERENCE TO RELATED APPLICATION

The present application claims priority to German Patent Application 10 2020 133 190.8, entitled "ELECTRIC MOTOR AND INVERTER ASSEMBLY", and filed on Dec. 11, 2020. The entire contents of the above-listed application is hereby incorporated by reference for all purposes.

TECHNICAL FIELD

The present disclosure relates to an electric motor and inverter assembly and to a method of assembling an electric motor and inverter assembly. Assemblies of the presently proposed type may find application in drivelines for automotive vehicles, for example.

BACKGROUND AND SUMMARY

JP5870797B2 discloses a three-phase motor, an inverter device, and a capacitor arranged on a center axis and integrated with the inverter device. The three-phase motor includes a rotor mounted on a housing and a stator fixed to the housing and connected to the inverter device. The capacitor includes a capacitance portion housed in an annular space, a positive electrode connection portion connected to a positive electrode terminal of the inverter device and a positive electrode plate of the capacitance portion, and a negative electrode connection portion connected to a negative electrode terminal of the inverter device and a negative electrode plate of the capacitance portion.

There is demand for an electric motor and inverter assembly, such as with a high degree of compactness and a long service life.

This object is solved by an electric motor and inverter assembly and by a method of assembling an electric motor and inverter assembly according to the embodiments disclosed.

The presently proposed electric motor and inverter assembly, according to embodiment described, may comprise:
 a motor housing portion,
 a DC bus bar assembly for electrically connecting a DC power source to an inverter power module, the DC bus bar assembly mounted on the housing portion, and a cooling channel disposed in between the housing portion and the DC bus bar assembly for cooling the DC bus bar assembly.

The cooling channel disposed in between the housing portion and the DC bus bar assembly for cooling the DC bus bar assembly contributes to a high degree of compactness of the proposed assembly.

The proposed assembly may comprise a DC power source such as a battery or a rechargeable battery. The DC bus bar assembly usually includes a first DC bus bar member electrically connected or configured to be electrically connected to a first electrode of the DC power source, and a second DC bus bar member electrically connected or configured to be electrically connected to a second electrode of the DC power source. The first and the second DC bus bar member may each be configured as or may each include a metallic plate or a metallic plate-like member which may be stacked on top of each other and electrically insulated from one another by an insulation layer disposed in between the first and the second DC bus bar member. Alternatively, the first and the second DC bus bar member may be coated with an insulating coating such as with a dielectric coating, for example.

The proposed assembly may further comprise a stator and/or a rotor defining a motor axis. Typically, the motor axis is coaxial with a rotation axis defined by the rotor or a symmetry axis defined by one or both of the rotor and the stator. The housing portion may extend transverse or perpendicular to the motor axis.

The housing portion may delimit the cooling channel. That is, the housing portion and the cooling channel may be arranged such that the housing portion or a part thereof may contact a cooling liquid held or flowing within the cooling channel.

The proposed assembly may further comprise webs or protrusions extending from the housing portion in the axial direction and delimiting the cooling channel. This may add to the compactness of the proposed assembly. The webs or protrusions and the housing portion may be formed in one piece. However, it is conceivable that the webs or protrusions and the housing portion are configured as separate members which are connected together, for example through a welded connection.

The proposed assembly may further include a heat transfer enhancing structure disposed within the cooling channel. This may increase the cooling efficiency of the proposed assembly, reduce or prevent overheating and prolong the service life of the proposed assembly. For instance, the heat transfer enhancing structure may include one or more of: fins or ribs, for instance formed in one piece with the housing portion, turbulizers, and metal foam.

The DC bus bar assembly may be disposed on a side of the housing portion facing the stator and/or the rotor. Or in other words, the DC bus bar assembly may be disposed on an inner side of a motor housing including the housing portion, wherein the motor housing houses or encloses the stator and the rotor. In this way, the motor housing and/or the housing portion may protect the DC bus bar assembly from an outside of the motor housing.

The proposed assembly may further comprise at least one capacitor electrically connected or connectable to the DC bus bar assembly. For example, the capacitor or each of the capacitors may include a first and a second electrode electrically connected or configured to be electrically connected to the first DC bus bar member and to the second DC bus bar member, respectively. The capacitor or the capacitors may be mounted on the DC bus bar assembly, for example on a side of the DC bus bar assembly averted from the housing portion. This may add to the compactness of the proposed assembly. Along the axial direction, the capacitor or the capacitors may be disposed in between the DC bus bar assembly and the rotor, or in between the DC bus bar assembly and the stator. And along a radial direction perpendicular to the axial direction the capacitor or the capacitors may be disposed in between a motor shaft connected with the rotor and a set of end windings of the stator.

The proposed assembly may further include first electrical connectors electrically connecting the capacitor or the capacitors to the DC bus bar assembly. For instance, some or each of the first electrical connectors may include an embedded portion embedded or received in the DC bus bar assembly or in one of the DC bus bar members and tapered toward the capacitor to which it is connected or tapered toward a side of the DC bus bar assembly averted from the housing portion. In this manner, for instance, a mechanically stable and long lived connection may be provided between the DC bus bar assembly and the capacitor or capacitors.

The DC bus bar assembly may close or cap the cooling channel. The cooling channel may then be delimited towards the DC bus bar assembly by an insulating layer disposed in between the cooling channel and the DC bus bar assembly. This arrangement may add to the compactness of the proposed assembly. For example, the DC bus bar assembly may be supported or mounted on the above-described webs or protrusions. The cooling channel may then be formed in between the housing portion, the webs or protrusions, and the DC bus bar assembly.

The proposed assembly may further comprise a motor shaft reaching through an opening or a through hole in the DC bus bar assembly. And the proposed assembly may further comprise a bearing, wherein the motor shaft is mounted on the housing portion via the bearing. The bearing may be disposed in between the DC bus bar assembly and the housing portion, for instance along the axial direction. The DC bus bar assembly may be configured and disposed such that it fixes or clamps the bearing to the housing portion. In this manner, the number of components needed for fixing the bearing to the housing portion or for mounting the bearing on the housing portion may be reduced, thereby further adding to the compactness of the proposed assembly.

The proposed assembly may further comprise at least one inverter power module mounted on the housing portion. For example, the DC bus bar assembly and the inverter power module or modules may be mounted on opposite sides of the housing portion. The cooling channel may then be disposed in between the DC bus bar assembly and the inverter power module or modules such that a cooling liquid held or flowing within the cooling channel may cool both the DC bus bar assembly and the inverter power module or modules. This arrangement may add to the compactness of the proposed assembly.

Inverter power modules are generally known in the art of electronic power devices. Each inverter power module usually selectively electrically connects the DC bus bar assembly, or, more specifically, selectively electrically connects either one of the two DC bus bar members to a pair of stator windings for controlling a direction, a magnitude and a wave form of an electric current in the corresponding pair of stator windings, thereby controlling a magnetic field produced by the stator. Usually, each inverter power module comprises power electronic switches, wherein each power electronic switch may include, for example, one or more metal-oxide-semiconductor field-effect transistors MOSFETs, one or more insulated-gate bipolar transistors IGBTs, one or more bipolar junction transistors BJTs, one or more Thyristors, one or more gate turn-off thyristors GTO, one or more junction field-effect transistors JFET, or the like. The power electronic switches may be arranged in known topologies such as a half bridge, an H-bridge, an active neutral-point clamped ANPC inverter, or the like.

The proposed assembly may further comprise second electrical connectors electrically connecting the inverter power module to the DC bus bar assembly. The second electrical connectors may reach through the housing portion. Additionally, some or all of the second electrical connectors may reach through or may reach at least partially through the DC bus bar assembly. Some or all of the second electrical connectors may clamp, fix or tight-fit the DC bus bar assembly to the housing portion. Using electrical connectors to mechanically clamp, fix or tight-fit the DC bus bar assembly to the housing portion may reduce the overall number of components of the assembly and may add to its compactness. All or some of the second electrical connectors may include an embedded portion embedded or received in the DC bus bar assembly or in one or both of the DC bus bar members, and tapered toward the housing portion.

The proposed assembly may further include at least one AC bus bar assembly, wherein each AC bus bar assembly then usually electrically connects one of the inverter power modules to one pair of stator windings. The AC bus bar assembly or AC bus bars may be mounted on the DC bus bar assembly, for example on a side of the DC bus bar assembly averted from the housing portion. The proposed assembly may then further comprise third electrical connectors electrically connecting the inverter power module to the AC bus bar assembly or electrically connecting each of the inverter power modules to each of the AC bus bars. The third electrical connectors may reach through the housing portion and through the DC bus bar assembly. This arrangement may add to the compactness of the assembly.

In one embodiment, the presently proposed method of assembling an electric motor and inverter assembly, comprises:

mounting a DC bus bar assembly on a motor housing portion to form a cooling channel disposed in between the housing portion and the DC bus bar assembly for cooling the DC bus bar assembly.

In one embodiment, the proposed method may further comprise:

mounting an inverter power module on the housing portion on a side of the housing portion opposite the DC bus bar assembly such that the cooling channel is disposed in between the DC bus bar assembly and the inverter power module for cooling both the DC bus bar assembly and the inverter power module, and passing one or more electrical connectors through the housing portion to electrically connect the inverter power module to the DC bus bar assembly.

In one embodiment, the proposed method may further comprise:

mounting one or more capacitors on the DC bus bar assembly on a side of the DC bus bar assembly averted from the housing portion and electrically connecting the one or more capacitors to the DC bus bar assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the presently proposed electric motor and inverter assembly and assembly method will become apparent to those skilled in the art from the following detailed description of exemplary embodiments of the assembly and method when considered in the light of the accompanying drawings. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1, 2, 4, 5A, 5B, and 5C are shown with components in proportional size with one another, according to some embodiments.

DETAILED DESCRIPTION

Figure 1:
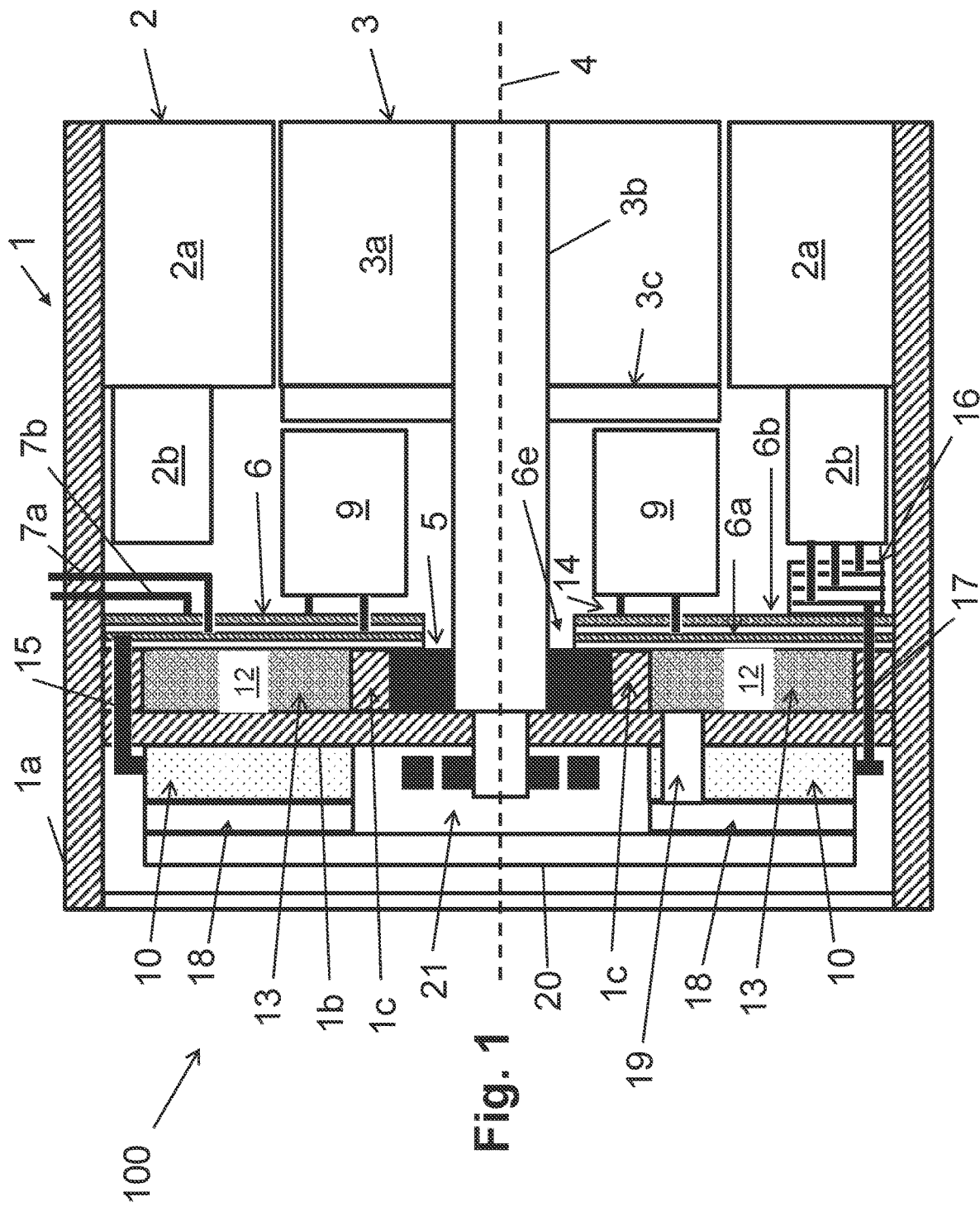
FIG. 1 schematically shows a sectional view of an embodiment of an electric motor and inverter assembly.
Figure 2:
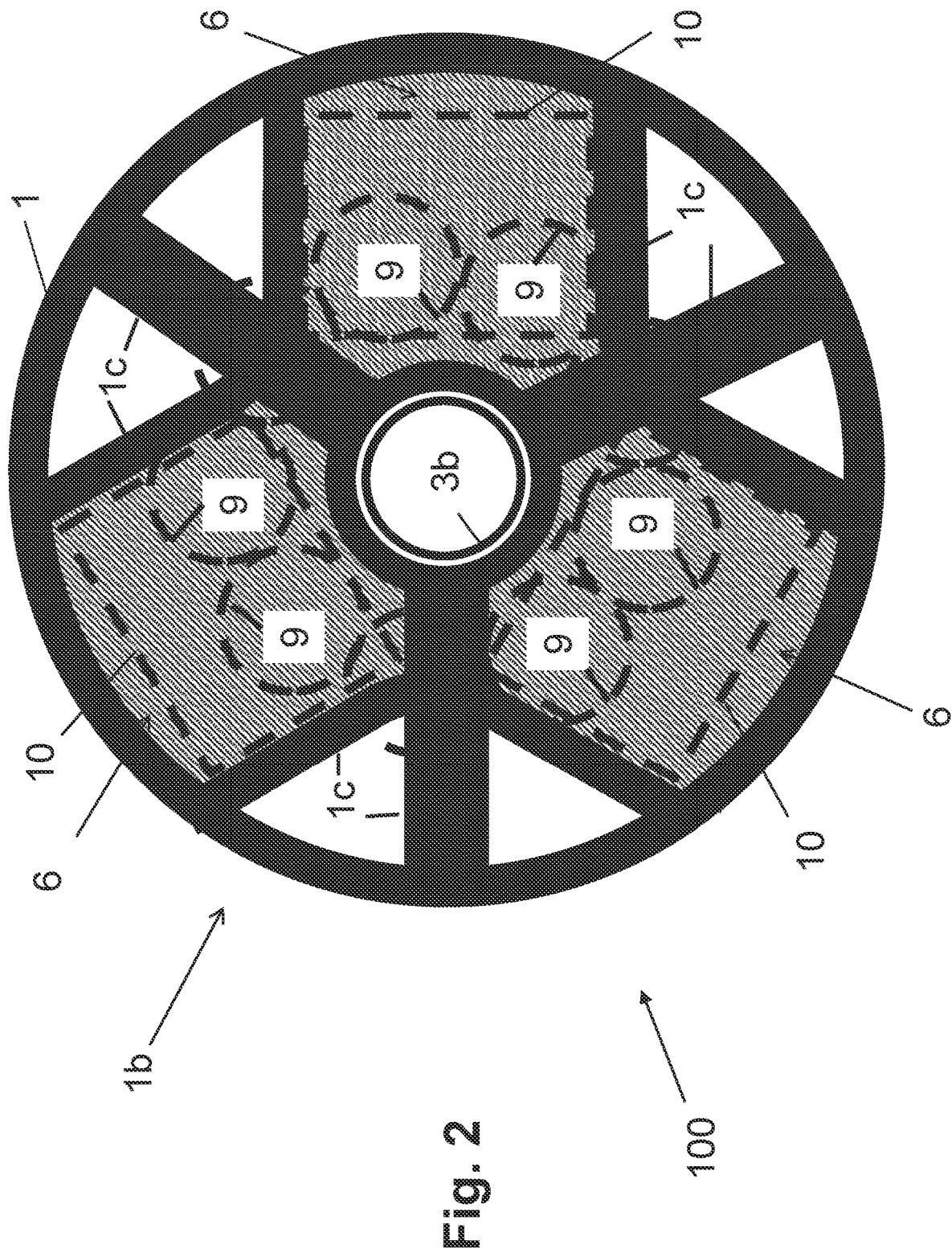
FIG. 2 schematically shows a plan view of the electric motor and inverter assembly of FIG. 1.

FIG. 1 schematically shows a sectional view of an electric motor and inverter assembly 100 of the presently proposed type, wherein the sectional plane includes a motor axis 4. By contrast, the viewing direction of FIG. 2 is along the motor axis 4. Here and in all of the following, the same features recurring in different figures are designated with the same reference signs. The assembly 100 may be part of a driveline of an electric vehicle or of an electric hybrid vehicle. For example, a torque produced by the assembly 100 may be transferred to the wheels of the vehicle for propelling the vehicle.

The assembly 100 includes a motor housing 1 having a side wall 1a and a motor housing portion 1b such as a motor housing flange or a motor housing end wall. In the embodiment depicted here, the side wall 1a has a cylindrical shape. However, it is understood that in alternative embodiments the side wall 1a may have other shapes. The motor housing 1 including the side wall 1a and the housing portion 1b may be made of an electrically non-conductive material such as plastic. However, it us understood that the side wall 1a and/or the housing portion 1b may be made of other materials. For example, in some embodiments the housing portion 1b may comprise or may be made of metal in order to enhance heat dissipation via the housing portion 1b.

The assembly 100 further includes a stator 2 and a rotor 3 disposed within the motor housing 1. The stator 2 is fixed with respect to the motor housing 1. By contrast, the rotor 3 is rotatable relative to the motor housing 1 and relative to the stator 2 with respect to a motor axis or rotation axis 4. The stator 2 and the rotor 3 are arranged symmetrically with respect to the motor axis 4. Here, the rotor 3 is disposed or at least partially disposed inside the stator 2 such that the stator 2 encloses or at least partially encloses the rotor 3. The stator 2 may comprise a plurality of laminations 2a stacked along the motor axis 4 and a plurality of stator windings 2b wrapped around the stacked laminations 2a. In the embodiment of the assembly 100 depicted here, the stator windings 2b include multi-phase windings. For instance, the stator windings 2b include three pairs of windings see FIG. 3 wherein each of the winding pairs is arranged symmetrically with respect to the motor axis 4 and the different winding pairs are evenly spaced by 120 degrees in a circumferential direction around the motor axis 4, as is commonly known from three-phase electric motors.

On the other hand, the rotor 3 comprises a magnetic portion 3a fixedly connected to a motor shaft 3b, and a rotor balancing plate 3c. The rotor magnetic portion 3a may include a permanent magnet or an electromagnet, for example. A magnetic field or, more specifically, a rotating magnetic field produced by phase shifted alternating electric currents in the multi-phase winding pairs 2b of the stator 2 is configured to interact with the rotor magnetic portion 3a to exert a torque on the rotor 3, thereby driving the motor shaft 3b. A resolver 21 may measure a rotational position of the motor shaft 3b.

The side wall 1a of the motor housing 1 may extend along an axial direction defined by the motor axis 4. That is, the side wall 1a closes the motor housing 1 perpendicular to the motor axis 4. For example, the side wall 1a may have a cylindrical shape and may be arranged symmetrically with respect to the motor axis 4. However, it is understood that the side wall 1a of the motor housing 1 may have other shapes. By contrast, the housing portion 1b extends transverse or, more specifically, perpendicular to the motor axis 4. The housing portion 1b closes the motor housing 1 along the axial direction defined by the motor axis 4. The side wall 1a and the housing portion 1b may be formed in one piece. However, the side wall 1a and the housing portion 1b may likewise be formed as separate pieces which are connected or joined together, for example through connecting means such as screws or bolts or by welding. The assembly 100 further includes a bearing 5 mounted on the housing portion 1a. The motor shaft 3b is supported by the bearing 5 and reaches through the housing portion 1a.

The assembly 100 further includes a DC bus bar assembly 6. The DC bus bar assembly comprises a first DC bus bar member 6a in the form of a first metallic plate, a second DC bus bar member 6b in the form of a second metallic plate, and an insulating layer 6c disposed in between the DC bus bar members 6a, 6b and electrically insulating the first DC bus bar members 6a, 6b from one another. The DC bus bar members 6a, 6b and the insulating layer 6c are stacked along the axial direction defined by the motor axis 4. DC connectors 7a, 7b electrically connect each of the DC bus bar members 6a, 6b to one of two poles 8a, 8b of a DC power source 8, such as a battery, a rechargeable battery, or the like. The assembly 100 further includes a plurality of capacitors 9 and inverter power modules 10. The capacitors 9 and the inverter power modules 10 are electrically connected in parallel between the poles 8a, 8b of the DC power source 8, or, equivalently, between the DC bus bar members 6a, 6b. The inverter power modules 10 on their part are electrically connected to the stator windings 2b. In the embodiment related to a three-phase electric machine depicted here, the assembly 100 includes three inverter power modules 10, wherein each of the three inverter power modules 10 is electrically connected with one of the three pairs of stator windings 2b. It is understood that in alternative embodiments, the assembly 100 may include any number of inverter power modules 10, including a single inverter power module 10.

Figure 3:
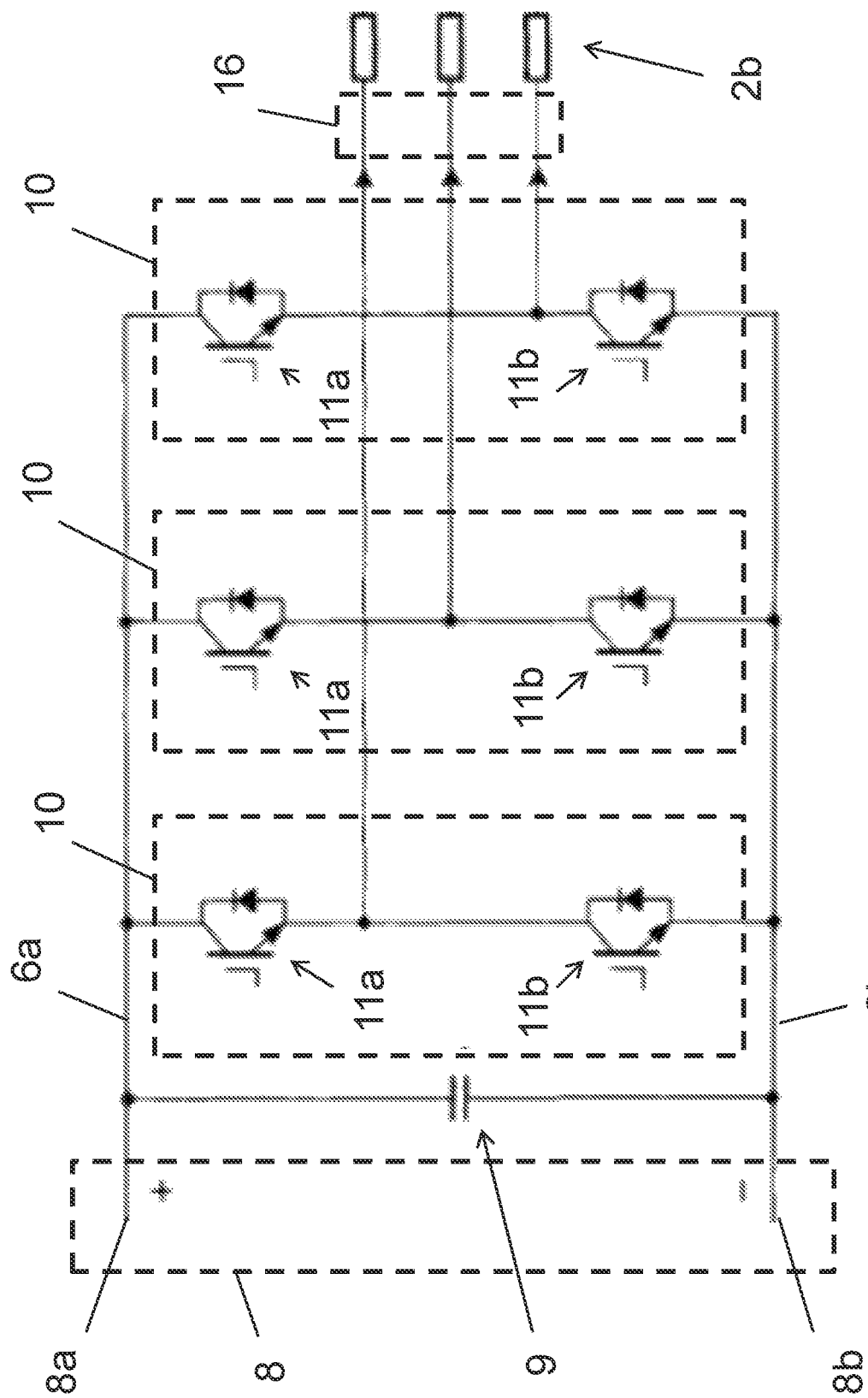
FIG. 3 schematically shows an electric circuit diagram of the electric motor and inverter assembly of FIG. 1.

A schematic electric circuit diagram representing the electrical connections between the DC power source 8, the DC bus bar assembly 6 including the DC bus bar members 6a, 6b, the capacitors 9, the inverter power modules 10 and the stator windings 2b is depicted in FIG. 3. Specifically, FIG. 3 shows an electric circuit diagram of a two-level inverter as is commonly known in the art of power electronics. The capacitors 9 and the three inverter power modules 10 of the three-phase electric machine described herein are electrically connected in parallel between the poles 8a, 8b of the DC power source 8. Each of the power modules 10 includes a pair of power electronic switches or semiconductor switches 11a, 11b, which may include, for example MOSFETs, IGBTs, BJTs, GTOs, JFETs, or the like. Each inverter power module 10 is electrically connected to one of the three pairs of stator windings 2b. The windings pairs 2b on their part may be electrically connected to one another via a Y-connection, a Δ-connection, or the like, as is commonly known in the art of power electronics. By appropriately controlling the timing and the duration of the opening and closing of the power electronic switches 11a, 11b, the inverter power modules 10 are configured to convert the DC voltage provided by the DC power source 8 to a three-phase alternating electric current in the three-phase stator windings 2b, thereby producing a rotating stator magnetic field for driving the rotor 3, for example.

The DC bus bar assembly 6 is mounted on the housing portion 6b. More specifically, the assembly 100 comprises webs or protrusions 1c which extend from the housing portion 1b in the axial direction defined by the motor axis 4. Here, the webs or protrusions 1c and the housing portion 1b are formed in one piece. However, it is understood that in alternative embodiments not depicted here the webs or protrusions 1c and the housing portion 1b may be formed as separate pieces joined or otherwise connected to one another. The plurality of webs or protrusions 1c have the same height or extension along the axial direction. The DC bus bar assembly 6 is mounted on or attached to the webs or protrusions 1c.

The housing portion 1b, the webs or protrusions 1c extending from the housing portion 1b and the DC bus bar assembly 6 are shaped and arranged in such a way that they form or enclose a cooling channel 12. The cooling channel 12 is at least partially delimited by the housing portion 1b and the webs or protrusions 1c extending from the housing portion 1b. More specifically, the housing portion 1b delimits the cooling channel 12 along the axial direction 4, and the webs or protrusions 1c delimit the cooling channel 12 in a lateral direction perpendicular to the axial direction 4. The DC bus bar assembly 6 on his part his part closes the cooling channel 12 along the axial direction 4. The cooling channel 12 is configured to hold or guide a cooling liquid such as water or glycol. Typically, the cooling channel 12 is connected to a cooling circuit that includes a pump for circulating the cooling liquid in the cooling circuit, and a heat exchanger for cooling the cooling liquid in the cooling circuit. A cooling liquid held within the cooling channel 12 may dissipate heat from the DC bus bar assembly 6 which may be produced by electric currents flowing between the DC power source 8 and the inverter power modules 10 and through the DC bus bar assembly 6.

In order to enhance the conductance of heat between the DC bus bar assembly 6 and the cooling channel 12 or a cooling liquid held within the cooling channel 12, the assembly 100 may further include a heat transfer enhancing structure 13 disposed in the cooling channel 12. In the embodiment depicted in FIG. 1 the heat transfer enhancing structure disposed within the cooling channel 12 includes a heat conducting foam, such as a metal foam.

Figure 5C:
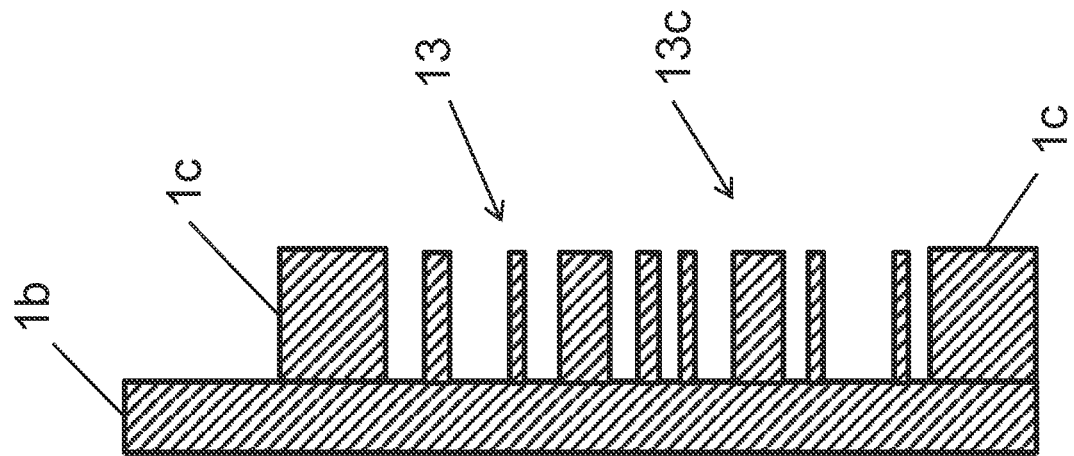
FIGS. 5A-C schematically show different implementations of a detail of the electric motor and inverter assembly of FIG. 1.
Figure 5B:
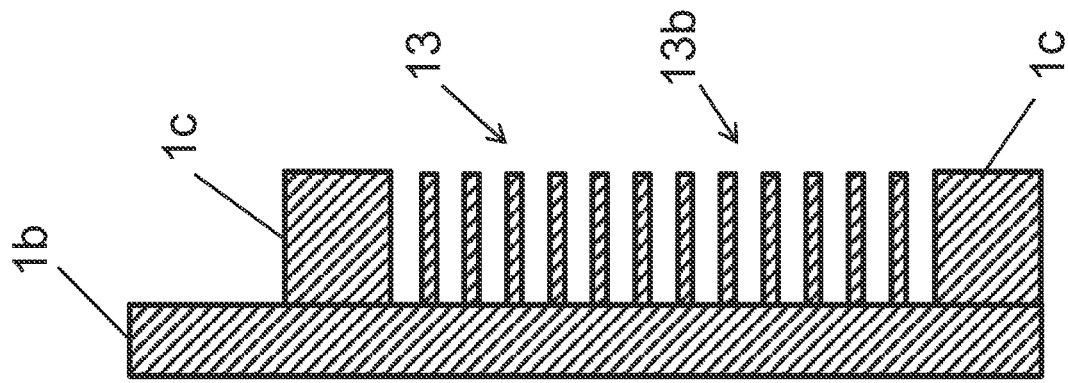
Figure 5A:
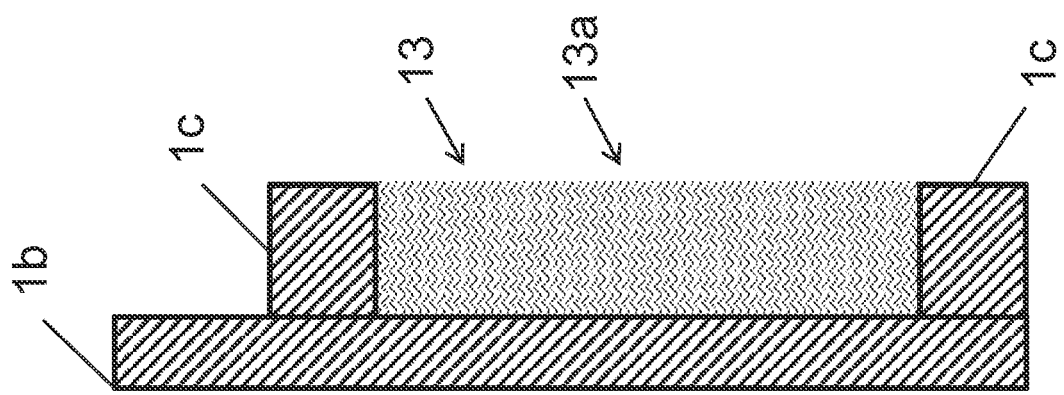

Alternative implementations of the heat enhancing structure 13 are depicted in FIGS. 5A-5C. According to the implementation shown in FIG. 5A, the heat enhancing structure 13 disposed within the cooling channel 12 includes a plurality of turbulizers 13a. The turbulizers 13a may be made of thin metal plates, for example, the turbulizers 13a may extend from the housing portion 1b along the axial direction 4. However, it is understood that the turbulizers 13a may be arranged in a different manner or may extend in other directions. According to the implementation shown in FIG. 5B, the heat enhancing structure 13 disposed within the cooling channel 12 includes a plurality of fins 13b. The fins 13b may extend from the housing portion 1b along the axial direction 4. The fins 13b may be equally spaced from one another. The fins 13b and the housing portion 1b may be made of the same material. The fins 13b and the housing portion 1b may be made in one piece. According to the implementation shown in FIG. 5C, the heat enhancing structure 13 disposed within the cooling channel 12 includes a heat sink 13c designed by artificial intelligence. For example, the heat sink 13c may include geometric structures of different sizes, heights or shapes. The structures of the heat sink 13c may be non-equally spaced with respect to one another. The structures of the heat sink 13d and the housing portion 1b may be made of the same material. The structures of the heat sink 13d and the housing portion 1b may be made in one piece.

In order to electrically insulate the DC bus bar members 6a, 6b from a cooling liquid held or flowing in the cooling channel 12, a further insulating layer 6d is disposed in between the DC bus bar assembly 6 and the cooling channel 12. For instance, the further insulating layer 6d comprises or is made of a material with a high heat conductivity so that heat may be efficiently dissipated from the DC bus bar assembly 6 to the cooling liquid held within the cooling channel 12 via the further insulating layer 6d. For example, the insulating layer 6d may be laminated or glued onto a side of the DC bus bar assembly 6 facing the housing portion 1b. Similarly, the further insulating layer 6d disposed in between the cooling channel 12 and the DC bus bar assembly 6 may be glued or otherwise joined to the webs or protrusions 1c extending from the housing portion 1b, thereby joining the DC bus bar assembly 6 to the housing portion 1b. Additionally or alternatively, the DC bus bar assembly 6 may be mounted on or connected to the housing portion 1b via connecting members such as pins, screws, bolts, or the like. Thus, it understood that the further insulating layer 6d may not be joined or glued to the webs or protrusions 1c and/or to the DC bus bar assembly 6, but may be clamped in between the DC bus bar assembly 6 and the housing portion 1b or in between the DC bus bar assembly 6 and the webs or protrusions 1c.

The DC bus bar assembly 6 is disposed on a side of the housing portion 1b facing the stator 2. In other words, along the axial direction 4 the DC bus bar assembly 6 is disposed in between the housing portion 1b and the stator 2. Or put yet differently, the DC bus bar assembly 6 is disposed on an inner side of the motor housing 1.

The one or more capacitors 9 which are electrically connected to the DC bus bar assembly 6 are mounted on, mechanically connected or attached to the DC bus bar assembly 6. The one or more capacitors 9 are mounted or disposed on a side of the DC bus bar assembly 6 averted from the housing portion 1b. In other words, along the axial direction 4 the one or more capacitors 9 are disposed in between the DC bus bar assembly 6 and the stator 2 or in between the DC bus bar assembly 6 and at least a portion of the rotor 3 such as the magnetic portion 3a. Specifically, the one or more capacitors 9 may be mounted on the DC bus bar assembly 6 by means of pairs of electrically conducting pins or connectors 14. The pins or connectors 14 electrically and mechanically connect the capacitors 9 or each of the capacitors 9 to the first DC bus bar member 6a and to the second DC bus bar member 6b.

Figure 4:
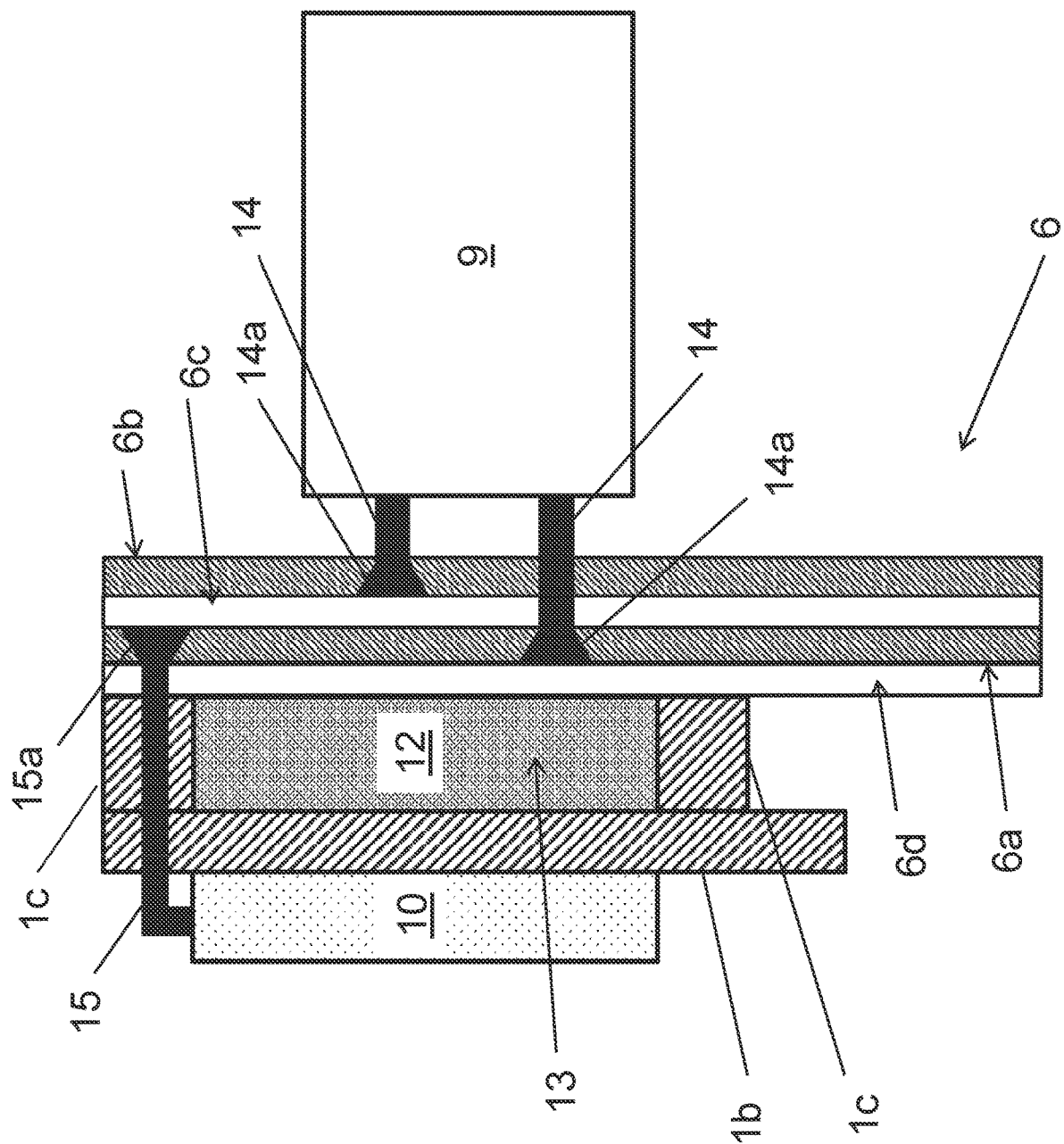
FIG. 4 schematically shows a detail of the electric motor and inverter assembly of FIG. 1.

One possible implementation of the connection between the capacitors 9 and the DC bus bar assembly 6 is depicted in FIG. 4, which shows a detail of FIG. 1. For example, the pin or connectors 14 each include a portion 14a which is embedded or at least partially embedded in or within the metallic plate forming the first DC bus bar member 6a and the second DC bus bar member 6b, respectively. The embedded portions 14a are tapered toward the capacitor 9. Or in other words, the embedded portions 14a of the pins or connectors 14 are tapered toward a side of the DC bus bar assembly 6 which is averted from the housing portion 1b.

The DC bus bar assembly 6 includes a through hole or clearance 6e. The motor shaft 3b reaches through the through hole 6e formed in the DC bus bar assembly 6. The bearing 5 supporting the motor shaft 3b on the housing portion 1b is at least partially disposed in between the housing portion 1b and the DC bus bar assembly 6. More specifically, the DC bus bar assembly 6 or a portion of the DC bus bar assembly 6 enclosing or edging the through hole 6e formed in the DC bus bar assembly 6 holds, clamps or fixes the bearing 5 in between the DC bus bar assembly 6 and the housing portion 1b. In this manner, no additional clamps or similar attachment members are needed for mounting the bearing 5 on the housing portion 1b.

The inverter power modules 10 are disposed on the housing portion 1b. For instance, the inverter power modules 10 are disposed on a side of the housing portion 1b opposite the DC bus bar assembly 6. In other words, along the axial direction 4 the housing portion 1b is disposed in between the inverter power modules 10 and the DC bus bar assembly 6 in such a way that the cooling channel 12 is disposed in between the inverter power module 10 and the DC bus bar assembly 6. In this manner, the cooling channel 12 or a cooling liquid held or flowing within the cooling channel 12 may additionally cool the inverter power module 10. That is, heat from the inverter power module 10 may be dissipated via a cooling liquid held or flowing within the cooling channel 12.

As can be seen in FIG. 1, the inverter power modules 10 are electrically connected to the DC bus bar assembly 6 via pins or connectors 15. For ease of illustration, FIG. 1 shows only a single connector 15 electrically connecting an inverter power module 10 with the first DC bus bar member 6a. It is understood that the assembly 100 typically includes additional connectors electrically connecting each of the inverter power modules 10 to the second DC bus bar member 6b, as indicated in FIG. 3, for example.

One possible implementation of the connection between the inverter power modules 10 and the DC bus bar assembly 6 is depicted in FIG. 4, which shows a detail of FIG. 1. The pin or connector 15 connecting the inverter power module 10 to the first DC bus bar member 6a reaches through the housing portion 1b. Further, the pin or connector 15 includes a portion 15a which is embedded or at least partially embedded in or within the metallic plate forming the first DC bus bar member 6a. The embedded portion 15a of the pin or connector 15 is tapered toward the inverter power module 10. Or in other words, the embedded portion 15a of the pin or connector 15 is tapered toward a side of the DC bus bar assembly 6 facing the housing portion 1b. The tapered portion 15a of the pin or connector 15 is received in a correspondingly shaped seat formed in the first DC bus bar member 6a. The pin or connector 15 thereby clamps or tight-fits the inverter power module 10 and the DC bus bar assembly 6 to the housing portion 1b.

On a side of the inverter power modules 10 averted from the housing portion 1b a cold plate 18 may additionally be attached to each of the inverter power modules 10 for cooling or for additionally cooling the inverter power module 10. The cold plates may include a housing including a hollow inner space for receiving and circulating a cooling liquid. For example, the cold plates 18 may be in fluid communication with the cooling channel 12 enclosed in between the housing portion 1b, the webs or protrusions 1c and the DC bus bar assembly 6, as indicated in FIG. 1 at 19. A printed circuit board (PCB) 20 is mounted on a side of the cold plates 18 averted or facing away from the housing portion 1b. The PCB 20 may include the circuitry for controlling the power electronic switches 11a, 11b of the inverter power modules 10.

FIG. 1 schematically shows that the assembly 100 further includes an AC bus bar assembly 16 which electrically connects each of the inverter power modules 10 to one of the pairs of stator windings 2b, as further indicated in FIG. 3. For example, the AC bus bar assembly 16 may include a stacked arrangement of metallic bars electrically insulated from one another by insulating layers disposed in between the metallic bars. The AC bus bar assembly 16 is mounted on the DC bus bar assembly 6. Specifically, the AC bus bar assembly 16 is mounted on a side of the DC bus bar assembly 6 averted from the housing portion 1b and facing the stator 2. In the example depicted in FIG. 1, the AC bus bar assembly 16 is electrically connected to the power module 10 through a pin or connector 17 which reaches through the housing portion 1b and through the DC bus bar assembly 6. For instance, the pin or connector 17 connecting the inverter power module 10 to the AC bus bar assembly 16 may clamp or tight-fit the inverter power module 10 and the AC bus bar assembly 16 to the housing portion 1b.

Figure 6:
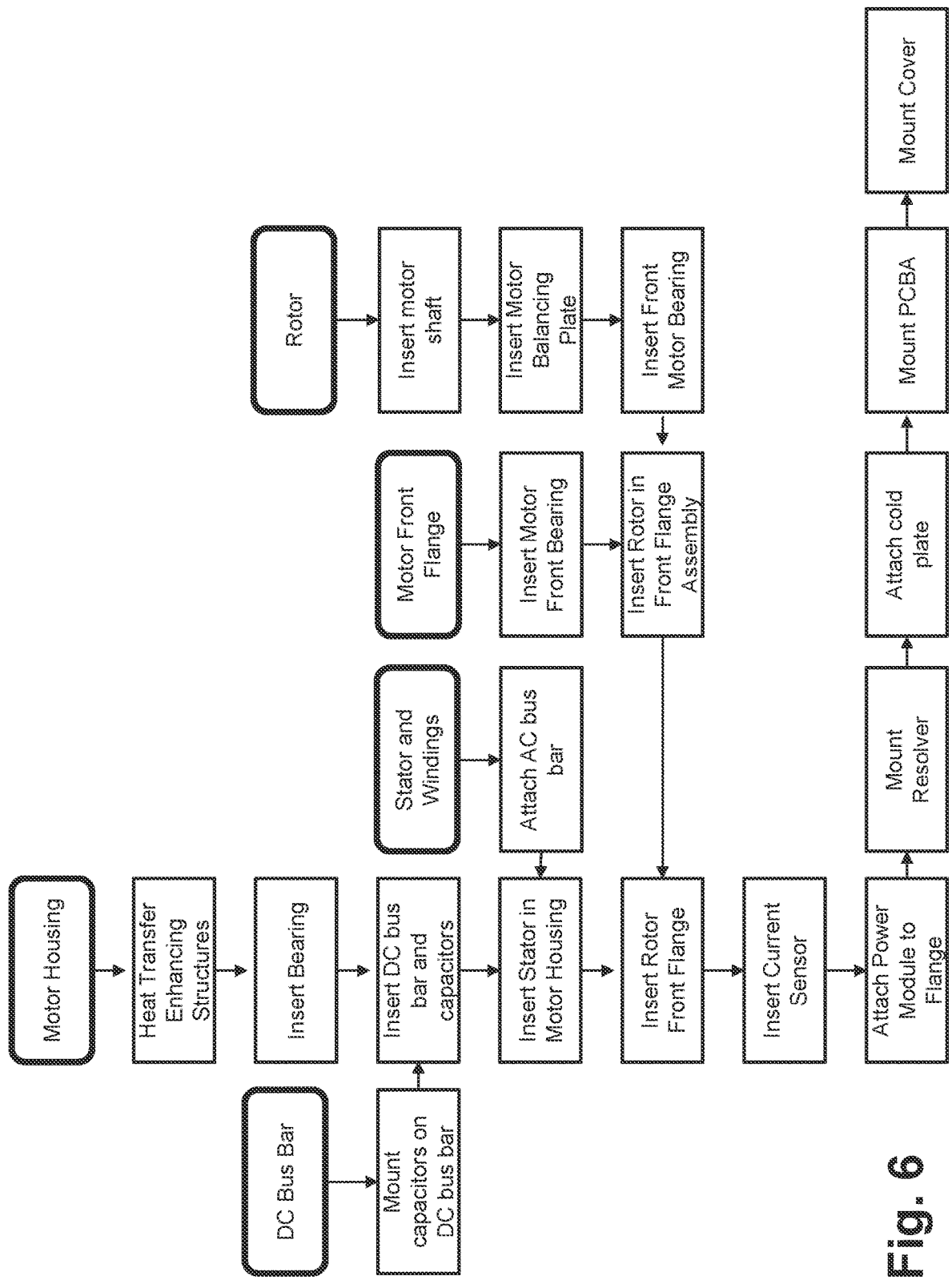
FIG. 6 shows steps of assembling the electric motor and inverter assembly of FIG. 1.

FIG. 6 depicts steps of a method of assembling the electric motor and inverter assembly 100 of FIG. 1. The method comprises the step of mounting the DC bus bar assembly 6 on the motor housing portion 1b to form the cooling channel 12 in between the housing portion 1b and the DC bus bar assembly 6 for cooling the DC bus bar assembly 6.

The method may further comprise mounting the inverter power module 10 on the housing portion 1b on a side of the housing portion 1b opposite the DC bus bar assembly 6 such that the cooling channel 12 is disposed in between the DC bus bar assembly 6 and the inverter power module 10 for cooling both the DC bus bar assembly 6 and the inverter power module 10, and passing one or more electrical connectors 15 through the housing portion 1b to electrically connect the inverter power module 10 to the DC bus bar assembly 6.

And the method may further comprise mounting one or more capacitors 9 on the DC bus bar assembly 6 on a side of the DC bus bar assembly 6 averted from the housing portion 1b and electrically connecting the one or more capacitors 9 to the DC bus bar assembly 6.

FIGS. 1, 2, 4, 5A, 5B, and 5C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

LIST OF REFERENCE SIGNS 1 electric motor and inverter assembly
1a side wall
1b housing portion
2 stator
2a laminations
2b stator winding
3 rotor
3a magnetic portion
3b motor shaft
3c rotor balancing plate
4 motor axis
5 bearing
6 DC bus bar assembly
6a first DC bus bar member
6b second DC bus bar member
6c, 6d insulating layers
6e through hole
7a, 7b DC connector
DC power source
8a, 8b poles of 8
9 capacitors
10 inverter power module
11a, 11b power electronic switch
12 cooling channel
13 heat transfer enhancing structure
13a turbulizers
13b fins
13c AI designed heat sink
14 connectors connecting 9 and 6
14a embedded portions of 14
15 connectors connecting 10 and 6
15a embedded portion of 15
16 AC bus bar 16
17 connector connecting 10 and 16
18 cold plate
19 cooling conduit
20 printed circuit board
21 resolver

The invention claimed is:

1. An electric motor and inverter assembly, comprising:
a motor housing portion;
a DC bus bar assembly for electrically connecting a DC power source to an inverter power module, the DC bus bar assembly mounted on the housing portion;
a cooling channel disposed in between the housing portion and the DC bus bar assembly for cooling the DC bus bar assembly;
a stator, wherein the DC bus bar assembly is disposed on a side of the housing portion facing the stator;
at least one capacitor electrically connected or connectable to the DC bus bar assembly and mounted on the DC bus bar assembly on a side of the DC bus bar assembly averted from the housing portion; and
first connectors electrically connecting the at least one capacitor to the DC bus bar assembly, wherein all or some of the first connectors include an embedded portion embedded or received in the DC bus bar assembly and tapered toward the at least one capacitor.

2. The electric motor and inverter assembly of claim 1, further comprising a rotor defining a motor axis, wherein the housing portion extends transverse to the motor axis.

3. The electric motor and inverter assembly of claim 1, wherein the housing portion delimits the cooling channel.

4. The electric motor and inverter assembly of claim 2, further comprising webs or protrusions extending from the housing portion in the axial direction and delimiting the cooling channel, wherein the webs or protrusions and the housing portion are formed in one piece.

5. The electric motor and inverter assembly of claim 1, further including a heat transfer enhancing structure disposed within the cooling channel, the heat transfer enhancing structure including one or more of: fins or ribs formed in one piece with the housing portion, turbulizers, and metal foam.

6. The electric motor and inverter assembly of claim 1, wherein the DC bus bar assembly closes the cooling channel.

7. The electric motor and inverter assembly of claim 4, wherein the DC bus bar assembly is supported on the webs or protrusions and the cooling channel is formed in between the housing portion, the webs or protrusions, and the DC bus bar assembly.

8. The electric motor and inverter assembly of claim 1, further comprising a motor shaft reaching through an opening or a through hole in the DC bus bar assembly.

9. The electric motor and inverter assembly of claim 8, further comprising a bearing, wherein the motor shaft is mounted on the housing portion via the bearing, the bearing is disposed in between the DC bus bar assembly and the housing portion, and the DC bus bar assembly fixes or clamps the bearing to the housing portion.

10. The electric motor and inverter assembly of claim 1, further comprising an inverter power module mounted on the housing portion, the DC bus bar assembly and the inverter power module mounted on opposite sides of the housing portion, and the cooling channel disposed in between the DC bus bar assembly and the inverter power module for cooling both the DC bus bar assembly and the inverter power module.

11. The electric motor and inverter assembly of claim 10, further comprising the stator including stator windings, and at least one AC bus bar assembly electrically connecting the inverter power module to the stator windings, the at least one AC bus bar mounted on the DC bus bar assembly on a side of the DC bus bar assembly averted from the housing portion.

12. The electric motor and inverter assembly of claim 11, further comprising third connectors electrically connecting the inverter power module to the at least one AC bus bar assembly, wherein the third connectors reach through the housing portion and through the DC bus bar assembly.

13. An electric motor and inverter assembly, comprising:
- a motor housing portion;
- a DC bus bar assembly for electrically connecting a DC power source to an inverter power module, the DC bus bar assembly mounted on the housing portion;
- a cooling channel disposed in between the housing portion and the DC bus bar assembly for cooling the DC bus bar assembly;
- an inverter power module mounted on the housing portion, the DC bus bar assembly and the inverter power module mounted on opposite sides of the housing portion, and the cooling channel disposed in between the DC bus bar assembly and the inverter power module for cooling both the DC bus bar assembly and the inverter power module; and
- second connectors electrically connecting the inverter power module to the DC bus bar assembly, wherein the second connectors reach through the housing portion and reach through or reach at least partially through the DC bus bar assembly, the second connectors clamping or tight-fitting the DC bus bar assembly to the housing portion.

14. The electric motor and inverter assembly of claim 13, wherein all or some of the second connectors include an embedded portion embedded or received in the DC bus bar assembly and tapered toward the housing portion.

15. A method of assembling an electric motor and inverter assembly, the method comprising:
- mounting a DC bus bar assembly on a motor housing portion to form a cooling channel disposed in between the housing portion and the DC bus bar assembly for cooling the DC bus bar assembly; and
- arranging each of one or more capacitors so as to be, in an axial direction parallel to an axis of rotation of a rotor of the electric motor, in between the DC bus bar assembly and at least a portion of the rotor, and so as to be, in a radial direction perpendicular to the axial direction, in between a motor shaft connected with the rotor and a set of end windings of a stator of the electric motor.

16. The method of claim 15, further comprising:
- mounting an inverter power module on the housing portion on a side of the housing portion opposite the DC bus bar assembly such that the cooling channel is disposed in between the DC bus bar assembly and the inverter power module for cooling both the DC bus bar assembly and the inverter power module, and
- passing one or more electrical connectors through the housing portion to electrically connect the inverter power module to the DC bus bar assembly.

17. The method of claim 15, further comprising:
- mounting the one or more capacitors on the DC bus bar assembly on a side of the DC bus bar assembly averted from the housing portion and electrically connecting the one or more capacitors to the DC bus bar assembly.

* * * * *